(12) United States Patent
Pirasteh et al.

(10) Patent No.: US 7,062,020 B1
(45) Date of Patent: Jun. 13, 2006

(54) SYSTEM AND APPARATUS FOR IVR PORT SHARING

(75) Inventors: M. Hassan Pirasteh, Jacksonville, FL (US); Jeffrey J. Sager, Jacksonville, FL (US)

(73) Assignee: Convergys CMG Utah Inc., South Jordan, UT (US)

( * ) Notice: Subject to any disclaimer, the term of this patent is extended or adjusted under 35 U.S.C. 154(b) by 0 days.

(21) Appl. No.: 09/223,993

(22) Filed: Dec. 31, 1998

Related U.S. Application Data

(60) Provisional application No. 60/088,516, filed on Jun. 8, 1998.

(51) Int. Cl.
*H04M 11/00* (2006.01)

(52) U.S. Cl. ............... 379/88.18; 379/70; 379/265.02; 704/275

(58) Field of Classification Search .......... 379/70, 379/80, 82, 88.01, 88.02, 88.19, 88.2, 88.21, 379/72, 74, 81.01, 88.03, 88.04, 88.17, 266.02, 379/265.01, 266.01, 88.18, 88.09, 223, 201.1, 379/265.02, 221.11
See application file for complete search history.

(56) References Cited

U.S. PATENT DOCUMENTS

| | | | |
|---|---|---|---|
| 4,586,134 A * | 4/1986 | Norstedt | 709/228 |
| 4,792,968 A | 12/1988 | Katz | 379/92 |
| 4,845,739 A | 7/1989 | Katz | 379/92 |
| 4,930,150 A | 5/1990 | Katz | 379/93 |
| 4,932,046 A | 6/1990 | Katz et al. | 379/32 |
| 4,939,773 A | 7/1990 | Katz | 379/204 |
| 4,975,945 A | 12/1990 | Carbullido | 379/212 |
| 4,987,590 A | 1/1991 | Katz | 379/204 |
| 5,014,298 A | 5/1991 | Katz | 379/93 |
| 5,016,270 A | 5/1991 | Katz | 379/92 |
| 5,048,075 A | 9/1991 | Katz | 379/92 |
| 5,073,929 A | 12/1991 | Katz | 379/93 |
| 5,091,933 A | 2/1992 | Katz | 379/204 |
| 5,109,404 A | 4/1992 | Katz et al. | 379/88 |
| 5,128,984 A | 7/1992 | Katz | 379/92 |
| 5,179,585 A * | 1/1993 | MacMillan et al. | 379/212.01 |
| 5,185,787 A | 2/1993 | Katz | 379/204 |
| 5,218,631 A | 6/1993 | Katz | 379/88 |
| 5,224,153 A | 6/1993 | Katz | 379/93 |
| 5,251,252 A | 10/1993 | Katz | 379/92 |
| 5,255,309 A | 10/1993 | Katz | 379/88 |
| 5,259,023 A | 11/1993 | Katz | 379/88 |
| 5,283,731 A * | 2/1994 | Lalonde et al. | 379/100.11 |
| 5,297,197 A | 3/1994 | Katz | 379/204 |
| 5,325,421 A * | 6/1994 | Hou et al. | 379/88.03 |
| 5,349,633 A | 9/1994 | Katz | 378/88 |
| 5,351,285 A | 9/1994 | Katz | 379/94 |
| 5,359,645 A | 10/1994 | Katz | 379/93 |
| 5,365,575 A | 11/1994 | Katz | 379/92 |
| 5,412,708 A | 5/1995 | Katz | 348/14 |
| 5,442,688 A | 8/1995 | Katz | 379/156 |
| 5,495,284 A | 2/1996 | Katz | 348/15 |
| 5,511,112 A * | 4/1996 | Szlam | 379/266.06 |
| 5,553,120 A * | 9/1996 | Katz | 379/88.09 |
| 5,561,707 A | 10/1996 | Katz | 379/88 |
| 5,684,863 A | 11/1997 | Katz | 379/88 |
| 5,822,401 A * | 10/1998 | Cave et al. | 379/133 |
| 5,867,562 A * | 2/1999 | Scherer | 379/114.15 |

(Continued)

*Primary Examiner*—Gerald Gauthier
(74) *Attorney, Agent, or Firm*—Frost Brown Todd LLC

(57) ABSTRACT

A telecommunications system is described for dynamic port sharing of a multiple port, multiple script, IVR facility, using CTI server(s).

18 Claims, 2 Drawing Sheets

U.S. PATENT DOCUMENTS

| | | | |
|---|---|---|---|
| 5,970,124 A | * 10/1999 | Csaszar et al. | 379/101.01 |
| 6,014,427 A | * 1/2000 | Hanson et al. | 379/67.1 |
| 6,044,142 A | * 3/2000 | Hammarstrom et al. | 379/223 |
| 6,157,705 A | * 12/2000 | Perrone | 379/88.01 |
| 6,233,234 B1 | * 5/2001 | Curry et al. | 370/356 |
| 6,366,658 B1 | * 4/2002 | Bjornberg et al. | 379/88.18 |

* cited by examiner

SYSTEM AND APPARATUS FOR IVR PORT SHARING

This application claims the benefit of U.S. Provisional Application No. 60/088,516, filed Jun. 8, 1998.

BACKGROUND AND SUMMARY OF THE INVENTION

The present invention relates generally to telecommunications systems and apparatus, and more particularly, to a system and apparatus for handling a plurality of calls to an interactive voice response ("IVR") system.

In order to make the most efficient use of IVR ports, the present invention provides a system for dynamic port allocation based on DNIS (i.e., dialed number identification system, e.g., the incoming number, such as an 800 number). In an installation where the IVR voice channels are wired to the station side of the PBX switch, each IVR channel may have a single application program hard-assigned. Then these channels may be grouped into hunt-groups (from the PBX perspective) so that calls for each application may be routed to the hunt group for a specific client application. The channels in that hunt group may answer calls only for that client application and no other. This type of arrangement, while functional, is very inefficient because the number of channels assigned to a client's hunt group has to be large enough to handle the peak call volumes while during lower call volume periods many of the channels go unused.

A more efficient method of IVR channel use is to group all channels of an IVR box into one hunt group and then assign the client application dynamically, as the call arrives. This way, the channels are busy handling the mixed call volumes of many client projects and are available for any peak period of any project. The present invention is a unique "port sharing" system which is adapted to make maximum use of a limited IVR port resource.

In order to do dynamic port allocation, the IVR must be made aware of the incoming number that was called (usually an 800 or 900 number) before the call is actually answered. With the present invention the DNIS information may be passed to the IVR out-of-band (on a separate digital link) so that the IVR can allocate the correct application in a very short period of time (typically less than 500 milliseconds after the call arrives on the PBX switch).

The basic data flow for port sharing under the present invention is this:

1. The Call arrives on the PBX.

2. The PBX passes the DNIS and ANI ("Automatic Number Identification" of the phone from which a call is made, i.e., the calling number) information on to the telephony server.

3. The server formats the information and sends it to a background process on the IVR.

4. The background process determines that the message is meant for a port on this particular box and saves the DNIS and ANI data in memory.

5. The call arrives at the IVR port.

6. A special application that is preferably hard-assigned to every IVR port notices the port has an arriving call and asks the background process for the DNIS and ANI information.

7. The special application looks the DNIS up in a table, determines the correct application and executes that application on the port.

In addition to the novel features and advantages mentioned above, other objects and advantages of the present invention will be readily apparent from the following descriptions of the drawings and preferred embodiments.

DETAILED FUNCTIONAL DESCRIPTION

Figure 1:
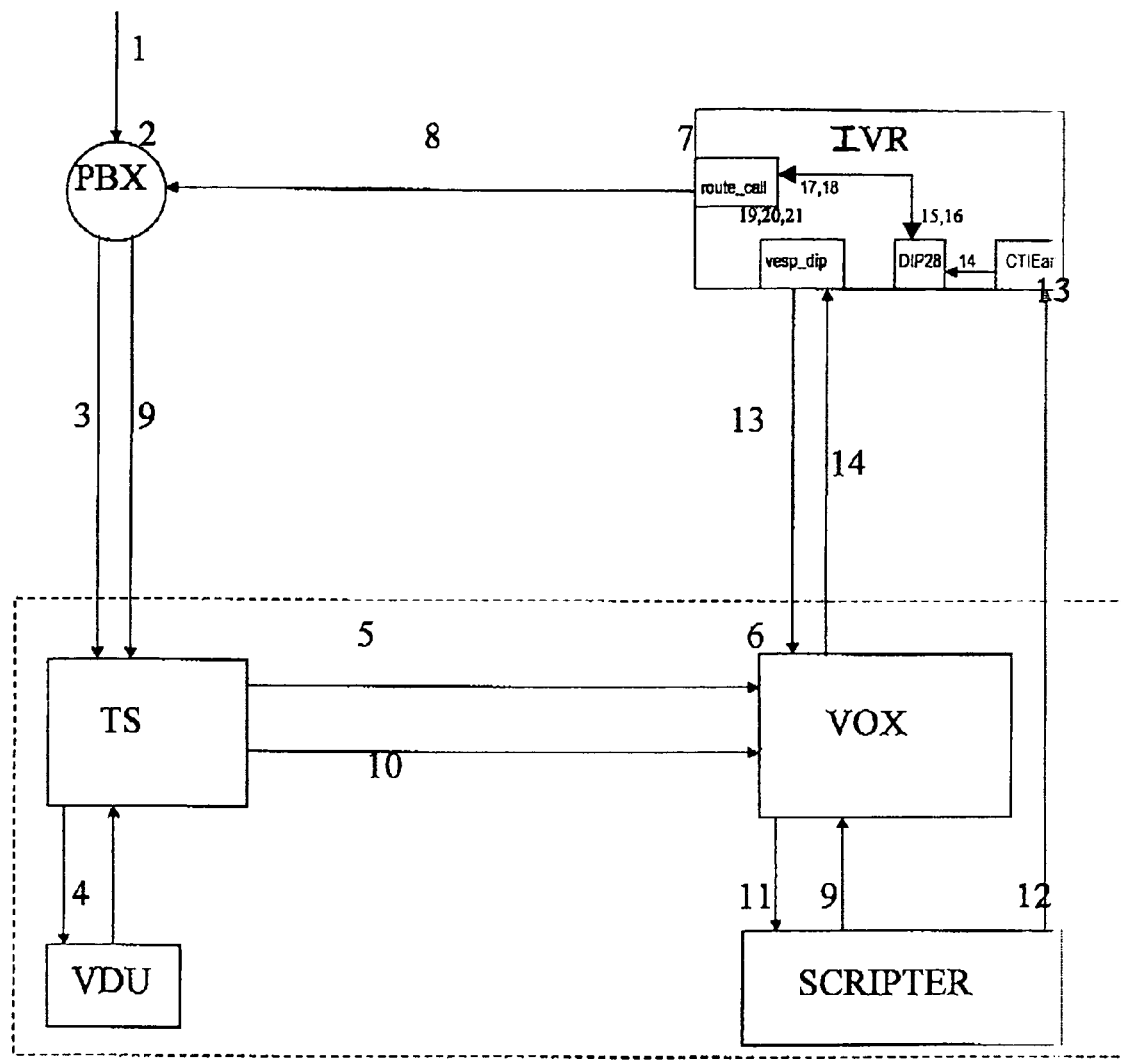
FIG. 1 shows a schematic diagram of one preferred embodiment of the present invention.
Figure 2:
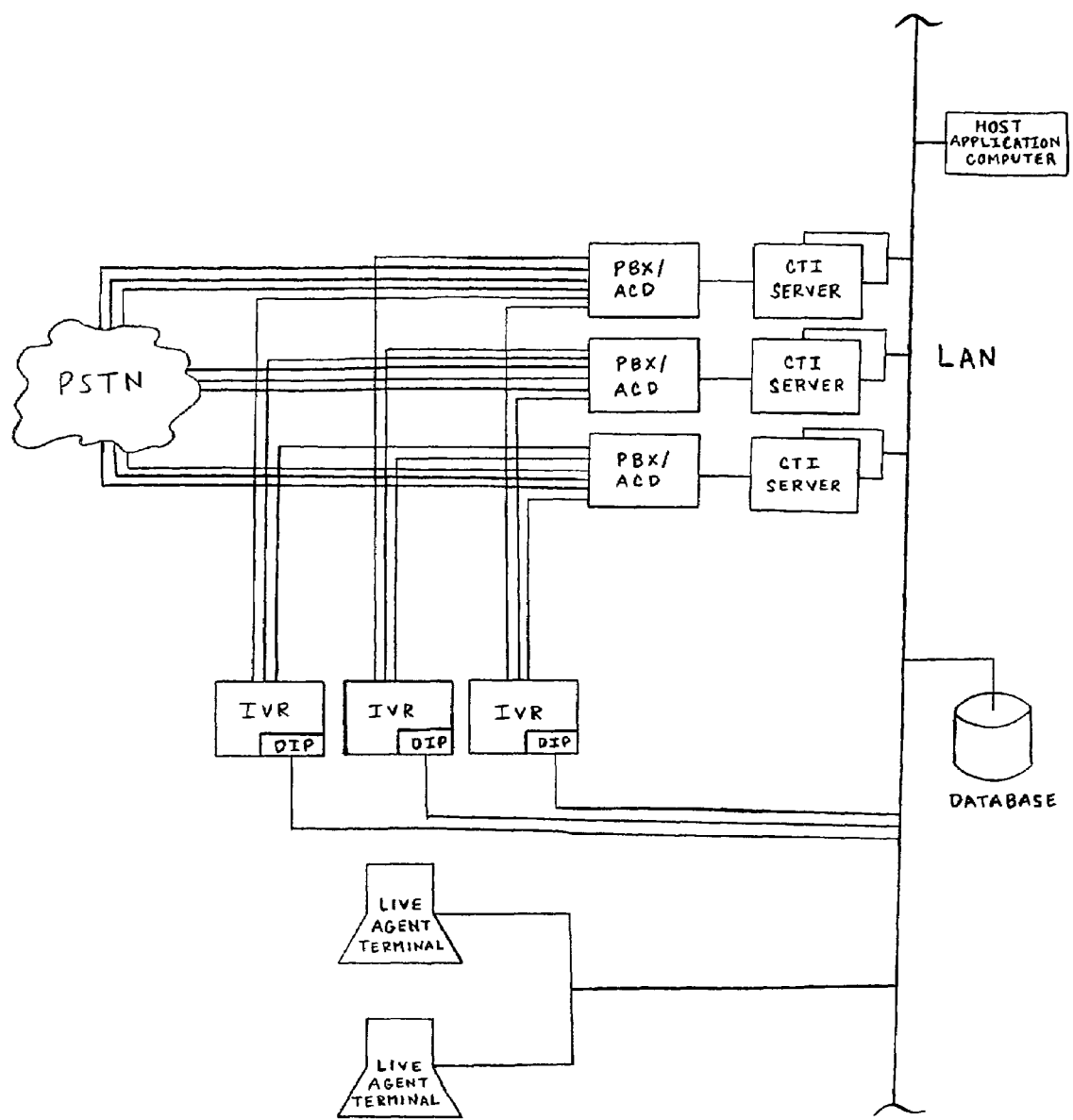
FIG. 2 shows a diagrammatical view of one embodiment of a CTI system adapted to function with the present invention.

Referring now to FIGS. 1 and 2, there is shown a preferred embodiment of the present invention using a Conversant IVR product (by Lucent Technologies) and a Nabnasset VESP CTI Middleware Software Product (by Quintus Corporation). As the communication steps are identified in FIG. 1, they are described below:

1. A call arrives at the PBX switch (e.g., DEFINITY by Lucent Technologies).

2. The switch follows the vector instructions and queues the caller to a Conversant ACD split.

3. The PBX notifies the VESP TS server of a new call which is being directed to a monitored extension.

4. The TS server requests that the VESP VDU server create a new VDU and assign a unique VDU ID.

5. The TS Server notifies the VESP VOX server that a call destined for an IVR port has arrived (the VOX is responsible for maintaining a state model of all IVR ports).

6. The VOX server waits to see that the call arrives at the IVR port.

7. The voice port of the IVR box recognizes an incoming call either via ring current (analog ports) or T1 messaging (Line Side T1 ports). The IVR automatically starts the application program assigned to every port called route_call.

8. The route_call application takes the phone off-hook.

9. The PBX informs the TS Server that the extension has gone off-hook.

10. The TS Server informs the VOX server of the off-hook state change.

11. The VOX Server issues a Script.Qualify 1 method call to the Scripter Server.

12. The Scripter maintains an internal table of all of the IVR machines monitored by the VOX server. It creates an ISDN-formatted message that includes the ANI, DNIS, CALLED EXTENSION, and AGENT_EXTENSION information and passes this message on to all IVR's using a Remote Procedure Call (RPC).

13. The remote procedure (to_d28( )) is contained in a program running on the IVR machines called CTIEar. The RPC facility is maintained in such a way that the TCP channel opened by the RPC is left open indefinitely to speed subsequent message passing.

14. The CTIEar program receives the message and passes it onto a UNIX message queue that is monitored by a unique program called DIP28_isdn.

15. The DIP28_isdn program receives the message from the message queue and determines if it is meant for this particular IVR box by matching the AGENT_EXTENSION against a list of the extensions known to be wired to this IVR.

16. If the message was in fact meant for this IVR box, the data is stored in memory for later retrieval.

17. The unique route_call application requests the ISDN information from DIP28_isdn using the get_ANI External Function call.

18. The DIP28_isdn program returns the information to route_call. If the information has not yet arrived (a rare occurrence) the route_call application sleeps for a small time period and asks for the information again and eventually the information is passed.

19. The route_call application parses the information and uses the DNIS value to perform an Oracle table lookup.

20. Assuming the Oracle table (ROUTE_APPL) contains an entry for this DNIS, a field in the table contains the name of the application program associated with that DNIS and route_call executes that application.

21. If any of this protocol breaks down, the route_call application is programmed to ask the caller to re-enter the 800 number they have dialed and it uses that response to search the ROUTE_APPL table via a different field.

The IVR systems of the present invention utilize a call's ISDN information to dynamically assign applications to channels. This may be called "Port Sharing" because any given IVR port can be used by any client application to provide IVR service. This is much more efficient than hard-assigning client applications to individual ports and allows very high port utilization.

Hundreds of IVR ports may be shared by multiple applications. Based on the called DNIS, the correct application is dynamically assigned to the correct ACD extension that is wired to an IVR port. This may be done without connecting the IVR's to the PBXs with BRI links; without using the CONVERSE vector step to pass the DNIS using DTMF (because it adds too much time to the call duration); and over the method of CTI outside of VESP that involved gateway systems which communicated with the switch using ASAI/BRI links and passed the incoming call information to the IVR's during call setup.

During call setup the DNIS and ANI information is collected by the IVR before the port even detects ringing. This speeds the call setup process. Since the information is being passed in parallel with the PBX sending a ring signal to the IVR port, virtually no time is added to the total call duration (thus saving toll charges).

The information from the CTI server is passed via TCP/IP sockets and is collected by a DIP on the IVR and stored in temporary memory. When the port detects ringing, a locally developed application called route_call, which is assigned to the port, requests the ISDN information from the DIP and uses a table lookup to start the correct application on that port. On VESP enabled ports, route_call also initializes the call with the VOX server by issuing the "newcall" method and obtains the VDU ID for that call. The ISDN information and VDU ID are passed to the intended application program as needed.

Under an alternative VESP design the IVR waits for the port to detect ringing before initiating requests for DNIS and ANI information from the VDU. The IVR may generate three transactions with VESP: 1) the newcall transaction to obtain the VDU ID; 2) a getvdu transaction to obtain the DNIS; 3) another getvdu to obtain the ANI. These transactions add some amount of time to the call duration, perhaps a second or more, which when taken on a per call bases may not seem significant, but when multiplied by millions of IVR calls that may be taken each month becomes very significant. Thus, while this embodiment works, it is not preferred over the embodiment shown in FIG. 1.

When viewed in the most fundamental terms, the IVR may be treated like any other VESP client. The screen-pop function works on an agent workstation because the necessary information is sent to the workstation unsolicited before the agent hears the zip-tone (or ringing). The IVR reacts to real-time events presented by the callers. The present invention allows the VOX server to send information on to the IVR, unsolicited, at the time of an IncomingCall event as detected by the Telephony server. At a minimum the information content may be DNIS, ANI, and ACD extension. Ideally, the information passed should be user definable. Additional information may include such items as caller's name, account number, account balance, etc., to be passed before the call begins. The IVR might answer: "Thanks for calling XYZ Corp. Mr. Smith. When you last called you requested an account statement be mailed to you. How can we serve you today?"

Several qualities make the present invention unique, including:

1. Port Re-Use

Any IVR port in the call center can be used for any application. Beyond the initial database record that relates a DNIS to an application, there is no special set-up required for each project or each 800 number to re-use an IVR port.

2. Out-of-Band Communication

The present invention transfers the call information (i.e. ANI and DNIS) to the IVR system on a communications channel that is completely separate from the voice channel being used by the caller to talk to the IVR. This makes the port-sharing effort very efficient because the call data is communicated in parallel to the call being switched to the IVR and the IVR can know which application to start even before the phone "rings". Out-of-Band communication also simplifies the administration of the call flow—that is, the call flow designer does not have to take port-sharing into consideration when deciding to include an IVR in the design.

3. Client/Server Architecture

The IVR is simply one part of a larger system that encompasses many clients and servers (PBX, CTI Server, Administration Servers, etc.). Adding new IVR's or new CTI servers is routine and does not require any additional programming or infrastructure changes.

4. Application Program Transparency

IVR application "scripts" need not be aware of the port-share system. A script can be designed and tested without consideration being given to the port-sharing. Then, when implemented into production, the script will automatically work under the port-sharing system of the present invention. If, however, the application wishes to make use of the call data (ANI and DNIS), that data can be procured from the port-sharing system.

5. Data Cache

The call data is communicated once to the IVR when the call is originally set up and is cached there for subsequent use by the port-sharing system or by the application scripts if desired.

The system and apparatus of the present invention offer many additional advantages. With the present invention, two way communication between the PBX switch and the CTI server is available. The "hook-flash" method of transferring a voice or phone number is no longer necessary. Coordinated voice/data call transfer is seamless with the present invention. Intelligence may be added to the system via a database that may be accessed by the CTI server and knowledge obtained therefrom may be directed to a live agent's terminal screen. A single list of DNIS numbers may be maintained on the IVR instead of the IVR and the CTI server. Also, the present invention is adapted to manage the IVR ports state before, during, and after each call.

While the above preferred embodiment has been described with reference to particular, well known vendor equipment, it is to be understood that the invention is not limited to the preferred embodiments, and it is adapted to be accomplished using many variations and varieties of hardware and software. The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A system for call processing, comprising:

a telephone call receiving switch configured to receive incoming calls, wherein the telephone call receiving switch is further configured to detect and pass out of band call destination information comprising Dialed Number Identification Service (DNIS) information associated with an incoming call prior to answering the incoming call;

an IVR unit adapted to perform an audio script, wherein the IVR unit is in electronic communication with said telephone call receiving switch, wherein the IVR unit has a plurality of ports, wherein the IVR unit is configured to provide a plurality of applications at each port of the plurality of ports, wherein the IVR unit is further configured to answer the incoming call at any available port of the plurality of ports, wherein the IVR unit is configured to receive the out-of-band call destination information before answering the incoming call;

a server computer in electronic communication with said telephone call receiving switch for receiving the out-of-band call destination information from the telephone call receiving switch, wherein the server computer is further in electronic communication with said IVR unit, wherein the server computer is configured to forward the out-of-band call destination information to the IVR unit before the incoming call is answered at a first port of the plurality of ports of the IVR unit;

a network structure in electronic communication with said telephone call receiving switch, said IVR unit, and said server computer, wherein the network structure provides communication between the telephone call receiving switch and the server computer, between the telephone call receiving switch and the IVR unit, and between the server computer and the IVR unit; and a port sharing data interface processing (DIP) program in operation with said IVR unit, wherein said DIP program is adapted to enable said script to be performed on multiple ports of said IVR unit, wherein the IVR unit is configured to select an application from the plurality of applications to provide on the first port of the plurality of ports in accordance with the DIP program prior to answering the incoming call at the first port of the plurality of ports, wherein the application is selected in accordance with the out-of-band call destination information received by the IVR unit.

2. The system of claim 1, wherein the DIP program dynamically allocates scripts to ports of the IVR unit.

3. The system of claim 1, wherein the system manages IVR unit port state before, during, and after a call.

4. The system of claim 1, wherein a single list of DNIS numbers resides at said IVR unit.

5. A system comprising:

a plurality of telephone call receiving switches, wherein each telephone call receiving switch of the plurality of telephone call receiving switches is configured to detect and pass out of band call destination information comprising Dialed Number Identification Service (DNIS) information associated with an incoming call prior to answering the incoming call;

a plurality of multiple port IVR units adapted to play a plurality of scripts at each port of the multiple ports, wherein the IVR units are in electronic communication with said plurality of telephone call receiving switches, wherein each IVR unit of the plurality of IVR units is configured to answer an incoming call at any available port of the respective multiple ports, wherein each IVR unit of the plurality of IVR units is configured to receive out-of-band call destination information before answering an incoming call;

at least one server computer in electronic communication with said plurality of telephone call receiving switches for receiving the out-of-band call destination information from the plurality of telephone call receiving switches, wherein the at least one server is further in electronic communication with said plurality of IVR units, wherein said at least one server is configured to associate one of said plurality of scripts to the out-of-band call destination information;

a network structure facilitating electronic communication between said plurality of IVR units and said plurality of telephone call receiving switches, between said plurality of IVR units and said at least one server, and between said plurality of telephone call receiving switches and said at least one server; and a port sharing data interface processing program in operation with the plurality of IVR units, whereby each port of each IVR unit is monitored to determine its availability to receive a call, to request call destination information from said server via said network structure, and to play the one of said plurality of scripts associated with the out-of-band call destination information by the at least one server to a caller.

6. A method of handling a plurality of telephone calls received at a private branch switch (PBX) to efficiently use a plurality of ports of an interactive voice response (IVR) unit to provide a selected one of a plurality of applications, the method comprising:

in response to receiving a call at the PBX, passing call destination information comprising Dialed Number Identification Service (DNIS) information associated with the call out of band to the IVR unit before the call arrives at a port of said IVR unit, wherein the IVR unit is in communication with the PBX;

identifying an application from the plurality of applications, wherein the act of identifying comprises associating the call destination information with the identified application, wherein the IVR unit is configured to provide each of the plurality of applications at any port of the plurality of ports;

selecting a port of the IVR unit for receiving the call, wherein the port is selected irrespective of the call destination information;

assigning the call to the selected port of the IVR unit;

receiving the call at the selected port of the IVR unit after the IVR unit has received the out of band call destination information and after the application associated with the out of band call destination information has been identified; and in response to receiving the call at the IVR unit, executing the identified application at the selected port.

7. A method of handling a plurality of telephone calls received at a private branch switch (PBX) to efficiently use a plurality of ports of an interactive voice response (IVR) unit to provide a selected one of a plurality of applications, the method comprising:

in response to receiving a call at the PBX, detecting information associated with the call, wherein the information associated with the call comprises Dialed Number Identification Service (DNIS) and Automatic Number Identification (ANI) associated with the call;

passing the DNIS and ANI out of band to the IVR unit before the call arrives at a port of said IVR unit, wherein the IVR unit is in communication with the PBX;

identifying an application associated with the DNIS and the ANI, wherein the act of identifying is performed before ringing associated with the call is detected by the IVR unit;

selecting a port of the IVR unit for receiving the call, wherein the port is selected irrespective of the DNIS or ANI;

assigning the call to the selected port of the IVR unit; and in response to receiving the call at the IVR unit, executing the application at the selected port.

8. A method of handling a plurality of telephone calls received at a private branch switch (PBX) to efficiently use a plurality of ports of an interactive voice response (IVR) unit to provide a selected one of a plurality of applications, the method comprising:

in response to receiving a call at the PBX, passing call destination information comprising Dialed Number Identification Service (DNIS) information associated with the call to the IVR unit before the call arrives at a port of said IVR;

associating each of a plurality of call destinations with a corresponding application of the plurality of applications, wherein the IVR unit is configured to provide each application of the plurality of applications at any available port of the IVR unit;

storing the associations between each of the plurality of call destinations and each corresponding application of a plurality of applications;

in response to receiving the call destination information at the IVR unit, looking up the call destination of the call received at the PBX in the stored associations;

identifying an application associated with the received call destination information in accordance with the stored associations;

assigning the call to a selected one of the plurality of ports of the IVR unit, wherein the port is selected irrespective of the call destination;

receiving the call at the selected port of the IVR unit; and in response to receiving the call at the IVR unit, executing the application at the selected port.

9. The method of claim 8, wherein the act of passing call destination information to the IVR unit further comprises:

detecting Dialed Number Identification Service (DNIS) and Automatic Number Identification (ANI) associated with the call;

passing the DNIS and ANI out of band to the IVR unit before the call arrives at a port of said IVR unit; and answering the call at the PBX.

10. A system for call processing, comprising:

a telephone call receiving switch having a plurality of channels, wherein the telephone call receiving switch is configured to detect call destination information comprising Dialed Number Identification Service (DNIS) information associated with an incoming call, wherein the telephone call receiving switch is further configured to assign the incoming call to a selected one of the plurality of channels, wherein the telephone call receiving switch is further configured to pass the call destination information out of band to the selected channel, wherein the telephone call receiving switch is further configured to answer the incoming call;

a table containing a plurality of call destination records associated with a plurality of applications, wherein each call destination record of the plurality of call destination records is associated with at least one corresponding application of the plurality of applications;

a server apparatus in data communication with said table and said telephone call receiving switch, wherein the server apparatus is configured to receive the call destination information out of band, wherein the server apparatus is configured to identify an associated application from the plurality of applications with reference to the table and to a call identifier to the incoming call in response to receiving the call destination information;

an IVR unit that includes a port in telephony communication with the selected channel of the telephone call receiving switch, wherein the IVR unit is further in data communication with the server apparatus, the IVR including a port sharing data interface processing program responsive to the detected call destination information and incoming call reaching said port to access said associated program to perform on the selected port, the IVR unit being further configured to access said associated program before the call arrives at said port.

11. The system of claim 10, wherein the telephone call receiving switch is further configured to detect call origination information of the incoming call, wherein the associated application comprises an audio script, the system further comprising:

a scripter configured to prepare a script responsive to said call origination information.

12. The system of claim 1, wherein said telephone call receiving switch is further configured to detect and pass out of band Automatic Number Identification (ANI) associated with the call.

13. The system of claim 1, wherein the telephone call receiving switch comprises a private branch exchange (PBX).

14. The system of claim 1, wherein the telephone call receiving switch is further configured to inform the server computer when the call has been answered by the IVR unit.

15. The system of claim 1, wherein the IVR unit is further configured to detect ringing associated with the incoming call, wherein the IVR unit is further configured to request the call destination information in response to the detection of the ringing associated with the incoming call.

16. The system of claim 1, wherein the out of band call destination information further comprises an Automatic Call Distributor (ACD) extension.

17. The system of claim 1, wherein the IVR unit is further configured to cache at least a portion of the call destination information.

18. The system of claim 5, wherein at least a portion of the plurality of telephone call receiving switches comprises at least one private branch exchange (PBX).

* * * * *